United States Patent
Dreher et al.

(10) Patent No.: US 6,717,307 B2
(45) Date of Patent: Apr. 6, 2004

(54) CASE RETAINED EXTERNAL CAPACITOR

(75) Inventors: Lincoln J. Dreher, Black Mountain, NC (US); John A. Platz, Springfield, MO (US); Jeffrey J. Long, Ozark, MO (US)

(73) Assignee: Fasco Industries, Inc., Cassville, MO (US)

( * ) Notice: Subject to any disclaimer, the term of this patent is extended or adjusted under 35 U.S.C. 154(b) by 0 days.

(21) Appl. No.: 10/105,911

(22) Filed: Mar. 25, 2002

(65) Prior Publication Data

US 2002/0140304 A1 Oct. 3, 2002

Related U.S. Application Data

(60) Provisional application No. 60/279,149, filed on Mar. 27, 2001.

(51) Int. Cl.[7] ................................................. H02K 5/00
(52) U.S. Cl. .......................... 310/89; 310/72; 310/68 R
(58) Field of Search .............................. 310/89, 91, 72, 310/68 R, 67 R, 71

(56) References Cited

U.S. PATENT DOCUMENTS

| | | | |
|---|---|---|---|
| 1,545,422 A | 7/1925 | Graichen | |
| 1,894,724 A | 1/1933 | Apple | |
| 2,003,031 A | 5/1935 | Baker | 172/233 |
| 2,032,129 A | 2/1936 | Jackson et al. | 172/233 |
| 2,123,713 A | 7/1938 | Clark et al. | 175/315 |
| 2,219,495 A | 10/1940 | Sleeter et al. | 172/233 |
| 2,253,405 A * | 8/1941 | Veinott | 310/166 |
| 2,460,903 A * | 2/1949 | Peck | 361/513 |
| 2,683,824 A * | 7/1954 | Carville et al. | 310/72 |
| 3,011,083 A | 11/1961 | Jacob | 310/72 |
| 3,210,457 A | 10/1965 | Hancock et al. | 174/47 |
| 3,319,133 A | 5/1967 | Sparrow et al. | 317/230 |
| 3,395,298 A | 7/1968 | Shifley | 310/72 |
| 3,490,820 A * | 1/1970 | Lewis | 310/72 |
| 3,502,917 A | 3/1970 | Bizoe | 310/71 |
| RE27,824 E | 11/1973 | Cox | 317/259 |
| 3,909,683 A | 9/1975 | Kysely | 317/247 |
| 4,400,140 A | 8/1983 | Papst | 417/354 |
| 4,429,243 A | 1/1984 | Crow | 310/71 |
| 4,523,117 A | 6/1985 | Daniels | 310/71 |
| 4,580,189 A | 4/1986 | Dequasie et al. | 361/272 |
| 4,682,748 A * | 7/1987 | Freudenmann et al. | 248/73 |
| 4,727,274 A | 2/1988 | Adam et al. | 310/239 |
| 4,851,725 A | 7/1989 | Keck | 310/71 |
| 5,006,742 A * | 4/1991 | Strobl et al. | 310/88 |
| 5,148,347 A | 9/1992 | Cox et al. | 361/272 |
| 5,245,237 A * | 9/1993 | Fisher et al. | 310/89 |
| 5,277,387 A * | 1/1994 | Lewis et al. | 248/74.2 |
| 5,306,973 A | 4/1994 | Butcher et al. | 310/68 |

(List continued on next page.)

FOREIGN PATENT DOCUMENTS

WO        WO 01/01549        1/2001

OTHER PUBLICATIONS

Patent Abstract of Japan: JP 2001 061258.

Primary Examiner—Thanh Lam
(74) Attorney, Agent, or Firm—Andrus, Sceales, Starke & Sawall, LLP

(57) ABSTRACT

A case retained external capacitor that can be installed onto the motor sleeve of an electric motor. The case retained capacitor includes a capacitor case having a mounting clip formed along its inner wall. The mounting clip is sized to be retained within an attachment slot stamped from the motor sleeve. The capacitor case receives a capacitor having lead wires that extend out of the capacitor case and into the interior defined by the motor sleeve. During construction of a motor utilizing the case retained capacitor of the present invention, the capacitor case is installed along the motor sleeve by sliding the mounting clip into the attachment slot formed in the motor sleeve. Once the capacitor case is in place, the end plate of the motor is installed to prevent separation of the capacitor case from the motor sleeve.

22 Claims, 6 Drawing Sheets

U.S. PATENT DOCUMENTS

| | | | |
|---|---|---|---|
| 5,381,301 A | 1/1995 | Hudis | 361/275.2 |
| 5,406,187 A | 4/1995 | Harrison | 320/2 |
| 5,491,370 A | 2/1996 | Schneider et al. | 310/54 |
| 5,493,158 A | 2/1996 | Daniels | 310/68 |
| 5,548,169 A | 8/1996 | Iwasa et al. | 310/72 |
| 5,872,410 A | 2/1999 | Sudoff | 310/68 |
| 6,057,615 A | 5/2000 | Long | 310/68 |
| 6,229,236 B1 | 5/2001 | Fisher et al. | 310/89 |

\* cited by examiner

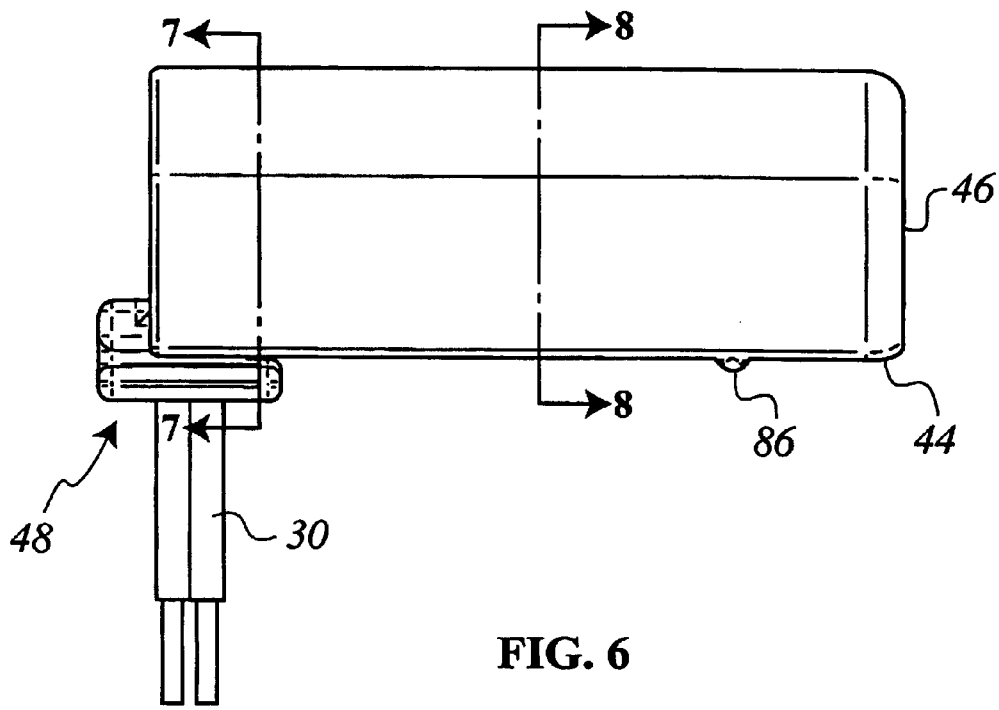
FIG. 6
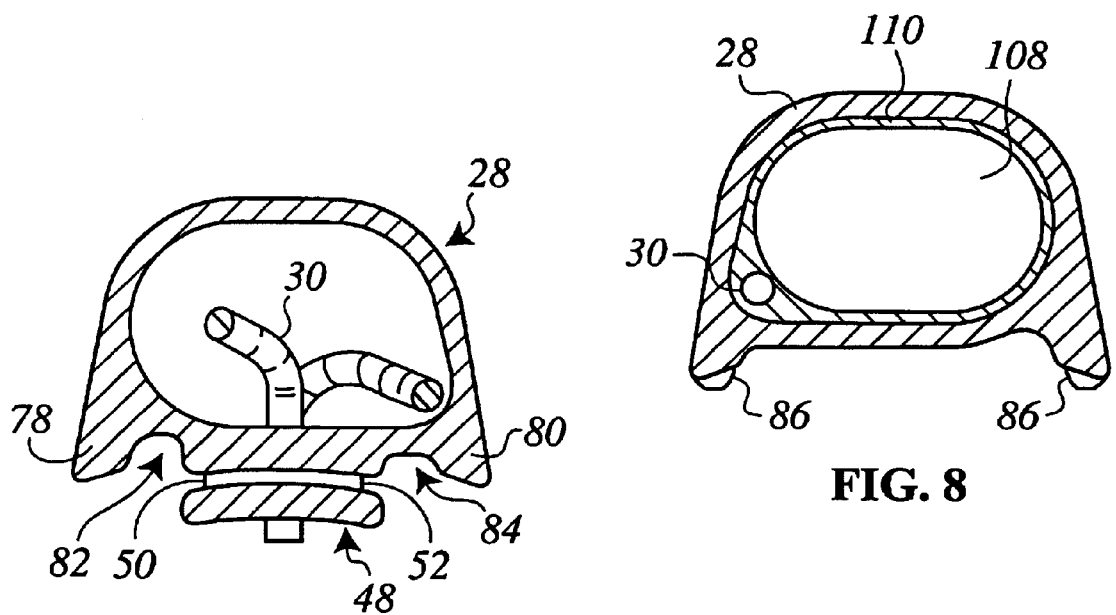
FIG. 7
FIG. 8

CASE RETAINED EXTERNAL CAPACITOR

CROSS-REFERENCE TO RELATED APPLICATION

The present application is based on and claims priority to U.S. Provisional Patent Application Serial No. 60/279,149, filed on Mar. 27, 2001.

BACKGROUND OF THE INVENTION

The present invention generally relates to the construction of electric motors. More specifically, the present invention relates to an electric motor having a capacitor assembly for the creation of an electrical phase shift to generate a rotating magnetic field in a single-phase AC motor.

As is known, electric motors include a stator and an armature (or rotor) with windings thereon. The motor is designed so that electric current through the stator and armature windings will generate opposed magnetic fields. Rotation of the motor shaft occurs as these magnetic fields attempt to align.

In an AC motor, it has been common practice in the industry to use a capacitor in the motor input circuit to create an electrical phase shift to generate a rotating magnetic field. Typical capacitor assemblies currently used in electric motors are either contained within the motor sleeve itself or are attached externally to the motor sleeve through the use of attachment hardware.

Referring now to FIG. 1, thereshown is a prior art configuration for the external mounting of a capacitor 10 to the motor sleeve 12 of an AC motor. As can be seen in FIG. 1, the motor sleeve 12 includes a pair of mounting studs 14 that extend from the generally cylindrical outer wall of the motor sleeve. During the construction of the motor incorporating the motor sleeve 12, the mounting studs 14 must be installed as a separate mounting step. The mounting studs 14 are spaced to allow the capacitor 10 to be positioned therebetween such that a metallic mounting strap 16 can be fitted over the capacitor 10 and secured to the mounting studs 14 by a pair of threaded nuts 18. Specifically, the metallic mounting strap 16 includes a pair of mounting holes 20 that receive the studs 14 and are secured by the pair of nuts 18.

The external capacitor 10 includes a pair of attached terminals (not shown, hidden under rubber boot 21). The two capacitor leads with attached mating terminals (not shown) extend out through the lead exit of the motor sleeve from the electric motor (stator assembly) in the interior of the motor sleeve 12 where they connect to the input power terminals for the AC motor. The rubber boot 21 is strung over the leads that extend out from the electric motor (stator assembly) through the lead exit of the motor sleeve. Once the external capacitor 10 is attached by the mounting bracket 16 and the capacitor lead terminals are connected to the capacitor terminals, the rubber boot 21 is installed over the entire arrangement to electrically insulate the capacitor, capacitor lead wires and their respective terminals. Again, the installation of the rubber boot 21 requires another step in the motor assembly process.

Although the attachment arrangement illustrated in FIG. 1 is an effective way to attach the external capacitor 10, additional parts and labor are required to fasten the capacitor 10 to the motor sleeve 12 and install the rubber boot 21 over the entire assembly. These additional parts and labor increase the overall costs and complexity of the motor.

Therefore, a need exists for an improved method and configuration for attaching an external capacitor to the outer motor sleeve of an electric motor. Further, a need exists for an external capacitor and respective leads that are adequately shielded and protected from external elements after the capacitor has been attached to the exterior of the motor sleeve.

SUMMARY OF THE INVENTION

The present invention is a case retained external capacitor that can be installed along the outer housing of an electric motor. The case retained capacitor of the present invention allows the capacitor to be installed during construction of an electric motor without requiring additional tooling, parts or manufacturing steps.

The case retained external capacitor includes a capacitor case that defines an open interior sized to receive a capacitor having attached lead wires. The lead wires of the capacitor are designed to be connected to the electric motor positioned within an external motor sleeve that surrounds the electric motor. The capacitor case is constructed having an inner wall that is positioned adjacent to the outer surface of the motor sleeve. The inner wall of the capacitor case includes a mounting clip that is formed to be received within an attachment slot stamped into the metallic motor sleeve. The attachment slot is formed such that it extends axially from a first end of the motor sleeve.

The mounting clip is formed integrally with the inner wall of the capacitor case and includes a pair of spaced receiving slots. The receiving slots of the mounting clip have a width to receive the thickness of the outer wall of the motor sleeve such that the capacitor case can be slid into the attachment slot. The mounting clip of the capacitor case includes a central notch that allows the leads of the contained capacitor to pass through the central notch and into the electric motor for connection across the power terminals of the electric motor.

Once the capacitor leads have been connected to the electric motor, an end plate is attached to the first end of the motor sleeve. The outer circumference of the end plate closes the attachment slot and prevents the mounting clip from being removed from the motor sleeve.

In one embodiment of the invention, the pair of sidewalls that define the capacitor case extend past the inner wall of the capacitor case and define a pair of standoff legs. The standoff legs each include a molded peg that is in contact with the outer surface of the motor sleeve such that the pegs and standoff legs create an air gap between the inner wall of the capacitor case and the outer surface of the motor sleeve.

In another embodiment of the invention, the capacitor case includes a standoff extension that extends from the inner wall of the capacitor case and provides additional spacing between the inner wall of the capacitor case and the outer surface of the motor sleeve. The standoff extension is formed along only a portion of the inner wall of the capacitor case.

In yet a further embodiment of the invention, the mounting clip formed along the capacitor case includes a pair of receiving slots that each include an angled wedge surface. Each wedge surface terminates at a top surface spaced slightly beneath the top end of the mounting clip. In this embodiment of the invention, the attachment slot formed in the motor sleeve is formed by a pair of angled sidewalls each of which include a retaining tab. The retaining tabs engage the top surfaces on the wedges to securely hold the mounting clip in place within the attachment slot.

During construction of the case retained external capacitor of the present invention, an initial supply of epoxy is poured into the open interior of the capacitor case. The capacitor material is then positioned within the capacitor case and the initial epoxy and the leads for the capacitor are positioned within the central notch formed in the mounting clip. Once the capacitor and leads are in place, a further supply of epoxy is poured into the open interior of the capacitor case such that the capacitor is waterproofed by the supply of epoxy.

Once the case retained external capacitor has been formed, the mounting clip is slid into the attachment slot formed in the motor sleeve and the capacitor leads connected to the electric motor. After the capacitor case has been properly positioned along the motor sleeve, the motor end plate is attached to prevent the capacitor case from becoming disengaged from the motor sleeve.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 6 is a side view of a first embodiment of the case retained capacitor;

FIG. 7 is a section view taken along line 7—7 of FIG. 6;

FIG. 8 is a section view taken along line 8—8 of FIG. 6; and

DETAILED DESCRIPTION OF THE INVENTION

Figure 2:
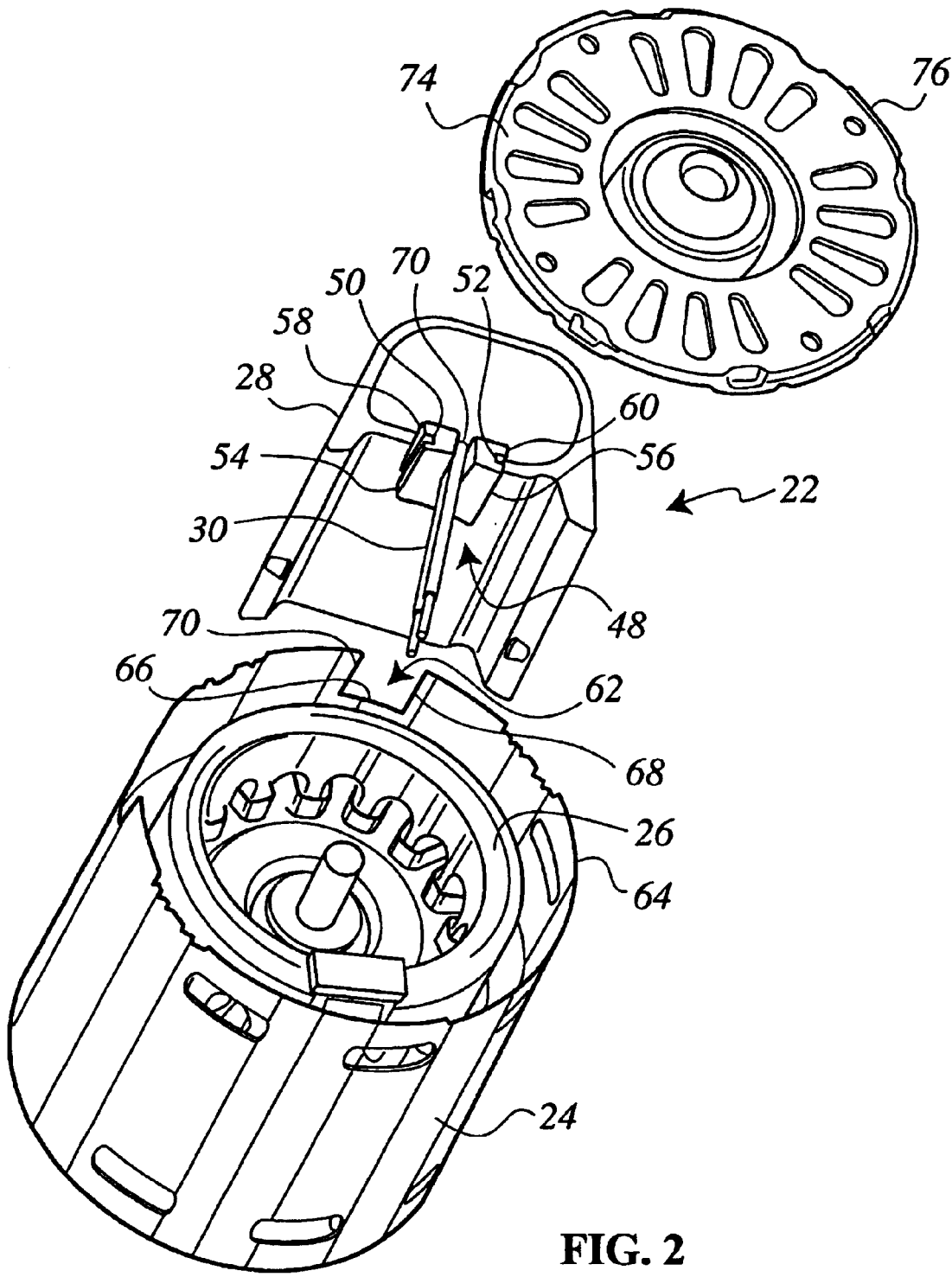
FIG. 2 is an exploded, perspective view illustrating the case retained capacitor, motor sleeve and end plate of the present invention.

Referring first to FIG. 2, thereshown is a case retained capacitor 22 of the present invention. The case retained capacitor 22 is configured to be mounted to the motor sleeve 24 of an AC electric motor 26. The case retained capacitor 22 generally includes an outer capacitor case 28 that is configured to receive a capacitor having a pair of lead wires 30 that can be connected across the power supply used to operate the electric motor 26.

Figure 3:
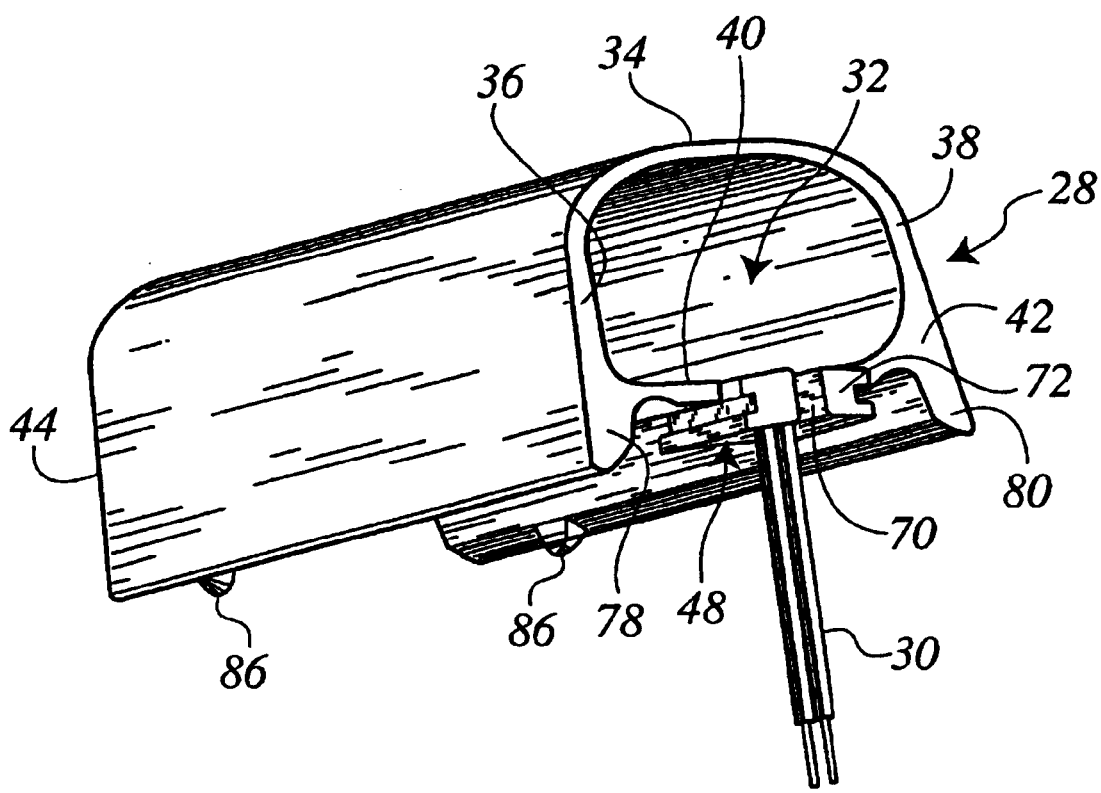
FIG. 3 is a front perspective view illustrating the capacitor case and capacitor leads of the case retained capacitor of the first embodiment of the invention.

Referring now to FIG. 3, the capacitor case 28 of the first embodiment of the invention defines a generally hollow, open interior 32 that is configured to receive the desired capacitor having leads 30. The capacitor case is defined by a curved outer wall 34, a pair of sidewalls 36 and 38, and an inner wall 40. The capacitor case 28 extends between a first end 42 and a second end 44. The second end 44 is defined by a bottom wall 46, as can be seen in FIG. 6. The bottom wall 46 provides support for a capacitor inserted into the capacitor case 28. In the preferred embodiment of the invention, the entire capacitor case 28 is formed from molded plastic as an integral piece.

Referring back to FIG. 3, the capacitor case 28 includes a mounting clip 48 formed at the first end 42. The mounting clip 48 extends from the inner wall 40 of the capacitor case 28. As can be seen in FIG. 2, the mounting clip 48 includes a pair of spaced receiving slots 50 and 52. The receiving slots 50, 52 are defined between a pair of outer lip portions 54 and 56 and a pair of inner lip portions 58 and 60. As can be understood in FIG. 2, the mounting clip 48 allows the capacitor case 28 to be installed on the motor sleeve 24.

Specifically, the motor sleeve 24 includes an attachment slot 62 that extends axially inward from a first end 64 of the motor sleeve 24. In the preferred embodiment of the invention, the motor sleeve 24 is formed from metal and the attachment slot 62 is stamped from the sleeve 24. The attachment slot 62 is defined by a bottom wall 66 and a pair of spaced sidewalls 68 and 70. During construction of an electric motor utilizing the case retained capacitor 22, the capacitor case 22 is positioned such that the mounting clip 48 is generally aligned with the attachment slot 62 of the motor sleeve 24. Once aligned, the capacitor case 28 is slid downward such that the sidewalls 68, 70 of the motor sleeve 24 are received in the receiving slots 50, 52 formed in the mounting clip 48. In the preferred embodiment of the invention, the width of the mounting clip 48 between the pair of receiving slots 50, 52 corresponds closely to the width of the attachment slot 62 between the pair of spaced sidewalls 68, 70. Thus, once the mounting clip 48 has been slid into the attachment slot 62, the pair of outer lip portions 54, 56 prevent the capacitor case 28 from being pulled radially outward and becoming disengaged from the attachment slot 62. The preferably snug fit between receiving slots 50,52 and spaced sidewalls 68,70 somewhat retains capacitor case 28 from axially sliding out of attachment slot 62. This snug fit allows the capacitor case 28 to remain in place for further motor assembly work prior to installing endplate 74.

Referring back to FIG. 3, the mounting clip 48 is constructed such that it includes a central notch 70 that extends axially inward from a first end 72 of the mounting clip 48. The central notch 70 has a width that allows the pair of leads 30 to extend out of the capacitor case 28. As illustrated, the width of the central notch 70 is selected such that the leads 30 are positioned on top of each other to prevent epoxy from flowing out of the capacitor case 28. The leads 30 each connect to capacitor material 108 submerged in the epoxy 100, as shown in FIGS. 7 and 8. The epoxy material is not shown in FIGS. 3–5 for the ease of illustration only. However, it should be understood that the case retained capacitor, including the case 28, includes a supply of epoxy and an internal capacitor.

When the capacitor case 28 is installed on the motor sleeve 24, the pair of leads 30 extend into the interior of the cylindrical motor sleeve 24 and can be connected to the electric motor 26, as can be understood in FIG. 2.

Once the capacitor case 28 has been installed along the motor sleeve 24, an end plate 74 is installed onto the first end 64 of the motor sleeve 24 in a conventional manner. When the end plate 74 is installed onto the motor sleeve 24, the outer circumference 76 of the end plate 74 covers the opening to the attachment slot 62 and prevents the mounting clip 48 from being axially removed from the attachment sot 62. In this manner, the end plate 74 secures the mounting clip 48, and thus the entire case retained capacitor 22, along the motor sleeve 24. Thus, once the end plate 74 has been installed, the capacitor case 28 cannot be removed from the motor sleeve 24, either axially or radially.

Figure 1:
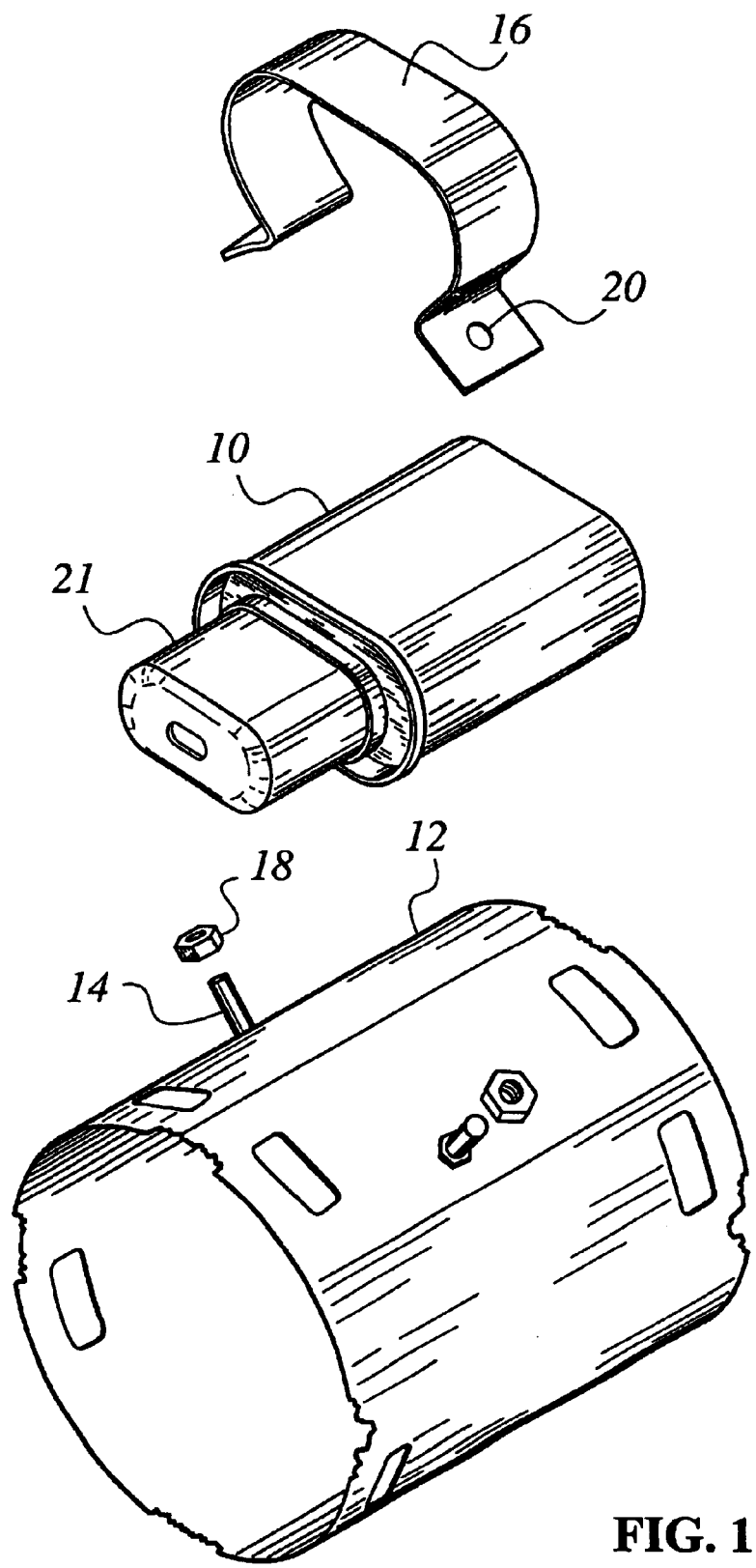
FIG. 1 is an exploded, perspective view illustrating the mounting arrangement of an external capacitor to the motor sleeve of an electric motor as is known in the prior art.

As discussed previously, the use of the capacitor case 28 of the present invention reduces the number of components and operating steps needed to install the external capacitor onto the electric motor, as compared to the prior art motor illustrated in FIG. 1. As described, the prior art motor required the steps of inserting the mounting studs 14, securing the mounting studs 14, positioning the external capacitor along the motor sleeve, attaching the mounting strap 16, securing the nuts 18, attaching the terminals to the capacitor leads, attaching the capacitor leads across the power leads of the motor, attaching the terminals of the capacitor lead to the terminals of the capacitor, and installing a rubber boot around the entire external lead and terminal structure to provide the required electrical insulation.

As can be understood in FIG. 2, the process of installing the case retained external capacitor 22 including the capacitor case 28 merely requires the step of attaching the integral capacitor leads 30 across the power leads inside the motor, aligning the mounting clip 48 with the attachment slot 62, sliding the mounting clip 48 into the attachment slot 62 and securing the end plate 74. Clearly, this method and apparatus reduces the number of components and the complexity of the assembly process relative to the prior art of FIG. 1.

Referring back to FIG. 3, in the first embodiment of the invention, each of the sidewalls 36, 38 extends past the inner wall 40 to define a pair of spaced standoff legs 78 and 80. A portion of the standoff legs 78, 80 contacts the curved outer surface of the metallic motor sleeve 24. The standoff legs 78, 80 create an air gap between portions of the inner wall 40 and the outer circumference of the motor sleeve 24. The air gap reduces the amount of heat transfer from the electric motor 26 within the motor sleeve 24 and the capacitor contained within the capacitor case 28. As illustrated in FIG. 7, the capacitor case 28 includes a pair of recessed channels 82 and 84 that provide for an additional air gap between the walls of the capacitor case 28 and the outer surface of the motor sleeve.

Referring back to FIG. 3, in the embodiment of the invention illustrated, the pair of standoff legs 78, 80 each include a molded peg 86 that spaces the pair of standoff legs 78 and 80 from the motor sleeve 24 to increase the air gap and increase the air flow between the capacitor case 28 and the motor sleeve 24. In the preferred embodiment of the invention, the minimal gap between the standoff legs 78, 80 and the motor sleeve 24 in combination with the sloping configuration of the sidewalls 36, 38 minimizes the graspable surface of the capacitor case. The minimal graspable surface reduces the likelihood that the capacitor case will be used as a handle to carry the motor, thus reducing undue stress on the mortis and tenon joint between the capacitor case 28 and the motor sleeve 24 during assembly handling.

Figure 4:
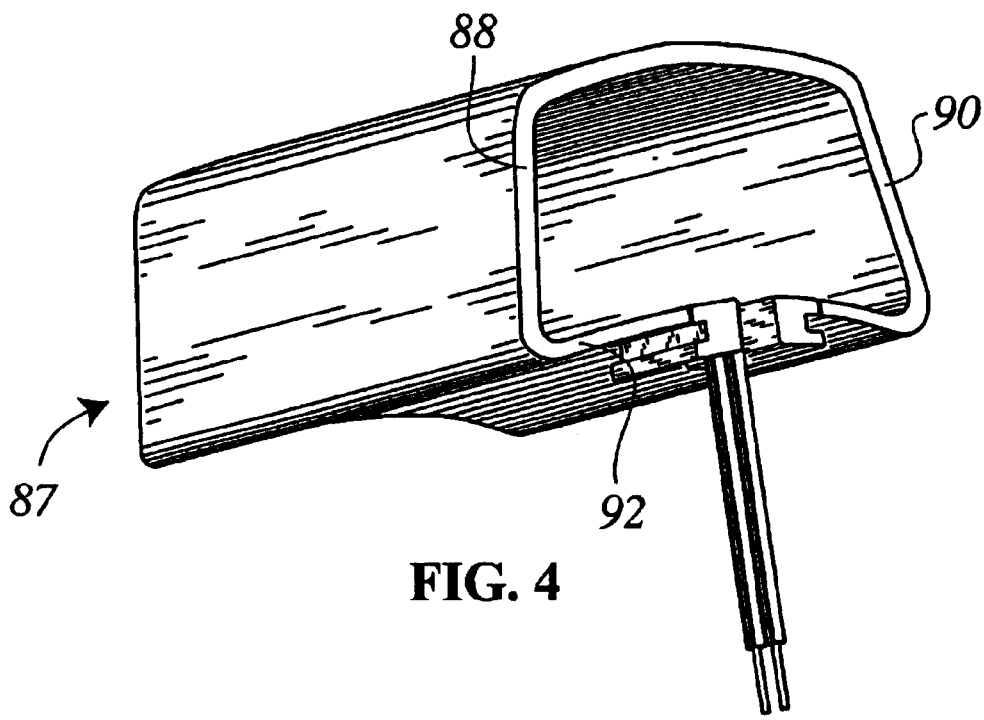
FIG. 4 is a front perspective view of the capacitor case and capacitor leads of the case retained capacitor of a second embodiment of the invention.

Referring now to FIG. 4, thereshown is a second embodiment of the capacitor case 87. In the embodiment illustrated in FIG. 4, each of the sidewalls 88, 90 terminate at the inner wall 92. In turn, the inner wall 92 is arcuate in shape and generally corresponds to the curvature of the outer circumference of the motor sleeve. Thus, when the capacitor case 87 is installed on the motor sleeve, the inner wall 92 is generally in contact with the outer circumference of the motor sleeve.

Figure 5:
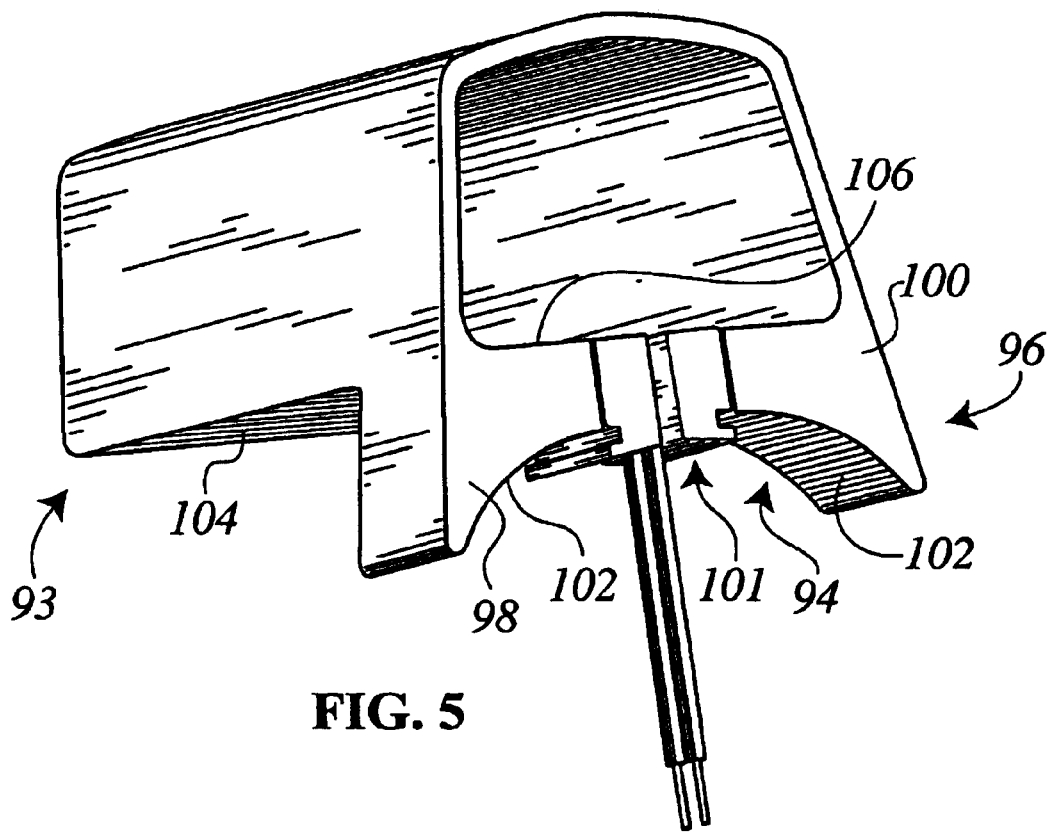
FIG. 5 is a front perspective view of the capacitor case and capacitor leads of a third embodiment of a case retained capacitor of the present invention.

Referring now to FIG. 5, thereshown is a third embodiment of the capacitor case 93. As can be seen in FIG. 5, the capacitor case 93 includes a standoff extension 94 formed at the first end 96 of the capacitor case. The standoff extension 94 includes a first standoff portion 98 and a second standoff portion 100 located on opposite sides of the mounting clip 101. Both of the standoff portions 98 and 100 include an arcuate contact surface 102. The arcuate contact surface 102 has a radius that generally corresponds with the outer circumference of the motor sleeve. As can be seen in FIG. 5, the contact surface 102 is located away from the outside surface 104 of the inner wall 106 such that when the capacitor case 93 is installed, the outer surface 104 is spaced from the motor sleeve to provide an air gap between the capacitor case 93 and the motor sleeve.

Although more than one embodiment of the capacitor case is illustrated in FIGS. 3–5, each capacitor case includes a capacitor (not shown) that is contained within the open interior defined by the outer walls of the capacitor case. During the construction of the case retained capacitor, an initial supply of epoxy is poured into the open interior defined by the capacitor case 28. Next, a capacitor made of such material as a wound coil of metalized polypropylene film flattened into an oval cross-section cylindrical shape with leads 30 attached to both ends is inserted into the open interior defined by the capacitor case 28 and the initial supply of epoxy 110, as illustrated in FIG. 8.

Once the capacitor 108 and leads 30 have been inserted, one of the two leads 30 passes upward along one of the inner walls of the case from where it connects to the bottom of the capacitor 108. The other lead 30 extends from where it connects to the middle of the top of the capacitor 108 and both leads 30 extend through the central notch formed in the mounting clip 48, as illustrated in FIG. 7.

In the embodiment of the invention illustrated in FIG. 8, the internal configuration of the capacitor case 28 is designed to closely correspond to the outer surface of the capacitor 108 and to the additional outer surface of one lead 30. Once the capacitor 108 has been installed and the leads 30 inserted into the central notch 70 formed in the mounting clip 48, a further supply of epoxy 110 is poured into the capacitor case 28 which completely surrounds the capacitor 108 and the leads 30. The epoxy 110 forms an electrically insulation, vibration damping and waterproof seal around the capacitor 108 and covers the entire top surface of the capacitor 108. Thus, when the case retained capacitor 22 is installed as illustrated in FIG. 2, the top of the capacitor case 28 is sealed by epoxy for electrical insulation and to prevent water from contacting the capacitor. Referring back to FIG. 8, the close configuration between the capacitor 108 and the interior surface of the capacitor case 28 reduces the amount of epoxy required.

In the present embodiment of the invention, the capacitor case 28 is molded from a suitable electrically insulating and tough material, such as plastic, for example polypropylene or Nylon 6/6. The combination of an electrically insulating case and insulating potting material 110, such as epoxy resin or urethane resin, prevent shock hazards from the capacitor material.

Figure 9:
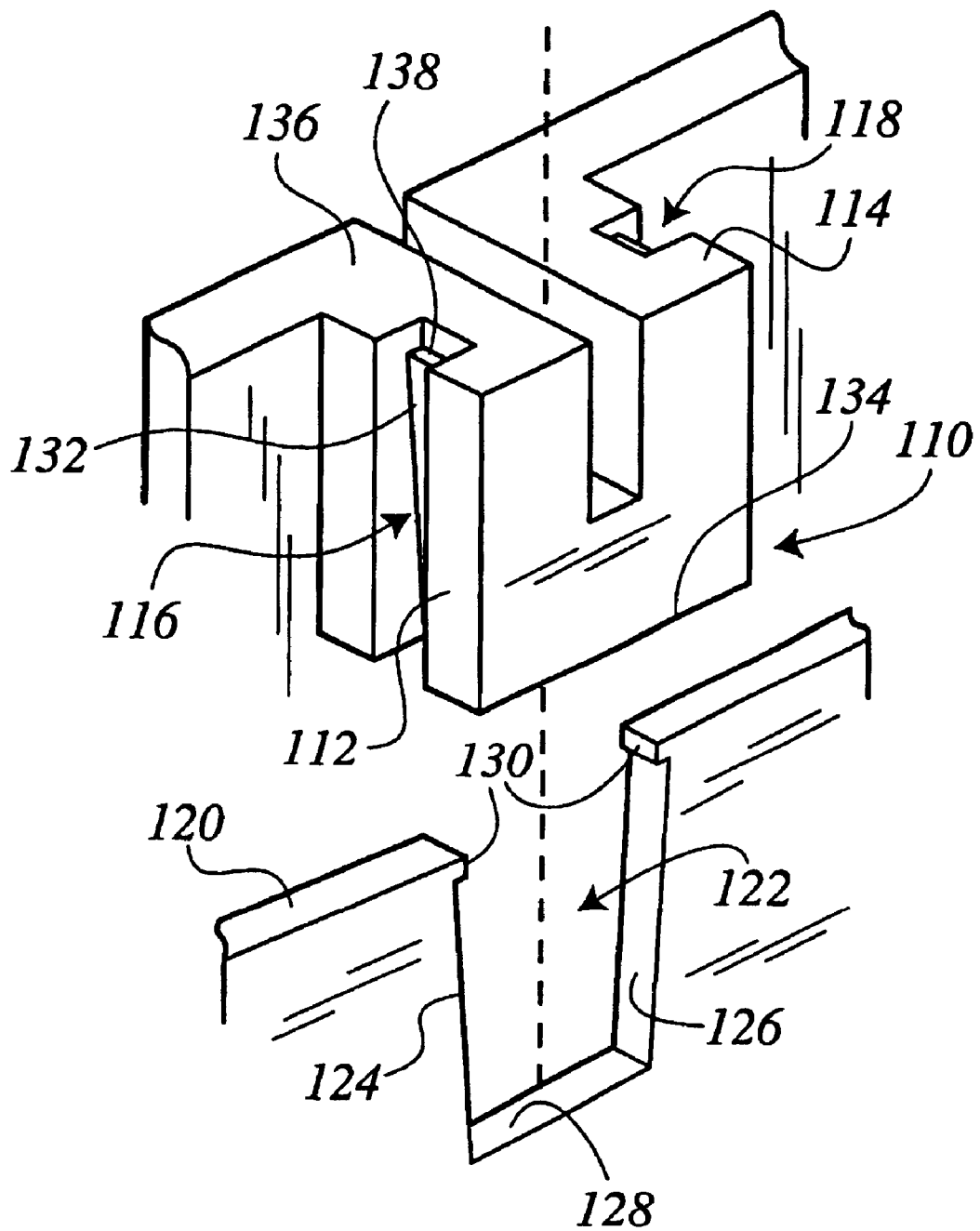
FIG. 9 is a partial perspective view illustrating an alternate embodiment of the mounting clip used on the case retained capacitor and the attachment slot formed in the motor sleeve.

Referring now to FIG. 9, thereshown is an alternate configuration for the attachment clip 110 used with the case retained capacitor of the present invention. As illustrated in FIG. 9, the attachment clip 110 includes the pair of outer lip portions 112 and 114 that define the pair of spaced receiving slots 116 and 118. As described previously, the width of each receiving slot 116, 118 is selected to accommodate the width of the outer wall 120 of the motor sleeve.

As illustrated in FIG. 9, the outer wall 120 includes the attachment slot 122 defined by a pair of spaced sidewalls 124, 126 and a bottom wall 128. In the embodiment of the invention illustrated in FIG. 9, the sidewalls 124, 126 flare outward as they extend upward from the bottom wall 128. Each of the sidewalls 124, 126 includes a retaining tab 130 formed at its upper end.

In the embodiment of the invention illustrated in FIG. 9, each of the receiving slots 116, 118 on the mounting clip 110 includes a wedge-shaped inner surface 132 that is angled progressively outward from the bottom end 134 of the mounting clip 110 to the top end 136. The taper of the surface 132 generally corresponds to the flare of the pair of sidewalls 124, 126 of the attachment slot 62. The wedge-shaped surfaces 132 each terminate with a locking surface 138 spaced from the top end 136 of the mounting clip 110. As the mounting clip 110 is slid into the attachment slot 122, the pair of retaining tabs 130 engage the locking surfaces 138 to secure the mounting clip 110 within the attachment slot 122.

In the embodiment of the invention illustrated in FIG. 9, the mounting clip 110 can be secured to the motor sleeve without attaching an end plate. This type of configuration is particularly useful in motor assemblies in which the capacitor is connected to the motor and mounted to the motor sleeve at either a different location in a plant or at a separate physical location from the location where the end plate is installed. The interaction between the locking surface 138 defined by the wedge-shaped surface 132 and the retaining tabs 130 allows the capacitor case to be held securely during shipment before the end plate is installed.

Various alternatives and embodiments are contemplated as being within the scope of the following claims particularly pointing out and distinctly claiming the subject matter regarded as the invention.

What is claimed is:

1. An outer housing for enclosing an electric motor, comprising:
    a cylindrical motor sleeve having a first end and a second end, the motor sleeve including an attachment slot extending axially inward from the first end of the motor sleeve;
    a capacitor case having a first end and a second end and defining an open interior, the capacitor case including an external mounting clip sized to be received within the attachment slot to mount the capacitor case on the motor sleeve;
    a capacitor positionable within the open interior of the capacitor case, the capacitor having a pair of leads for connection to the electric motor; and
    an end plate attached to the first end of the motor sleeve, wherein the end plate closes the open end of the mounting slot formed on the motor sleeve to retain the mounting clip of the capacitor case within the attachment slot.

2. The outer housing of claim 1 wherein the mounting clip is formed adjacent to the first end of the capacitor case.

3. The outer housing of claim 1 wherein the attachment slot is defined by a pair of spaced sidewalls, the mounting clip further including a pair of receiving slots spaced from each other to receive the sidewalls of the attachment slot.

4. The outer housing of claim 3 wherein each of the receiving slots formed in the mounting clip are defined by an outer lip portion, wherein the width of the mounting clip defined by the outer lip portions is greater than the width of the attachment slot to prevent the radial removal of the capacitor case from the motor sleeve.

5. The outer housing of claim 4 wherein the receiving slots frictionally engage the sidewalls of the attachment slot to axially retain the mounting clip in the attachment slot.

6. The outer housing of claim 1 further comprising a notch formed in the mounting clip of the capacitor case, the notch being sized to allow the capacitor leads to extend into the interior of the motor sleeve through the attachment slot.

7. The outer housing of claim 6 wherein the notch is open to the first end of the capacitor case.

8. The outer housing of claim 7 wherein each of the sidewalls are sloped from the inner wall to the outer wall.

9. The outer housing of claim 1 wherein the capacitor case includes an inner wall, an outer wall, and a pair of sidewalls, the mounting clip being attached to the inner wall.

10. The outer housing of claim 9 wherein the inner wall of the capacitor case is arcuate and generally corresponds to the curvature of the motor sleeve.

11. The outer housing of claim 9 wherein the sidewalls of the capacitor case extend past the inner wall to form a pair of standoff legs, the standoff legs being in contact with the motor sleeve such that the inner wall of the capacitor case is spaced from the motor sleeve to reduce thermal transfer from the electric motor to the capacitor.

12. The outer housing of claim 11 further comprising at least one peg formed on each standoff leg, the peg being in contact with the motor sleeve when the capacitor case is installed on the motor sleeve.

13. The outer housing of claim 9 wherein the capacitor case further includes a standoff extension extending from the inner wall, the standoff extension having a curved inner surface configured to contact the motor sleeve such that the inner wall of the capacitor case is spaced from the motor sleeve.

14. The outer housing of claim 13 wherein the standoff extension is formed along only a portion of the inner wall of the capacitor case near the first end of the capacitor case.

15. The outer housing of claim 3 wherein the pair of sidewalls defining the attachment slot each include a protruding retaining tab formed along the first end of the motor sleeve, the receiving slots formed on the mounting clip including an angled wedge surface terminating with a top surface, wherein each of the retaining tabs engage the top surface to hold the mounting clip within the attachment slot.

16. A combined capacitor and housing for use with an electric motor having a motor sleeve including an attachment slot extending from the first end of the motor sleeve, the combination comprising:
    a capacitor case having a first end and a second end and defining an open interior, the capacitor case including an external mounting clip sized to be received within the attachment slot to mount the capacitor case on the motor sleeve; and
    a capacitor positionable within the open interior of the capacitor case, the capacitor having a pair of leads for connection to the electric motor.

17. The combination of claim 16 further comprising a notch formed in the mounting clip of the capacitor case, the notch being sized to receive the capacitor leads and allow the capacitor leads to extend into the interior of the motor sleeve through the attachment slot.

18. The combination of claim 17 wherein the notch is open to the first end of the capacitor case.

19. The combination of claim 16 wherein the capacitor case includes an inner wall, an outer wall, and a pair of sidewalls, the mounting clip being formed along the inner wall of the capacitor case.

20. The combination of claim 19 wherein the inner wall of the capacitor case is arcuate and generally corresponds to the curvature of the motor sleeve.

21. The combination of claim 19 wherein the sidewalls of the capacitor case extend past the inner wall to form a pair of standoff legs, the standoff legs being in contact with the motor sleeve such that the inner wall of the capacitor is spaced from the motor sleeve.

22. The combination of claim 19 wherein the capacitor case further includes a standoff extension extending from the inner wall of the capacitor case, the standoff extension being formed along only a portion of the inner wall and including a curved inner surface configured to contact the motor sleeve wherein the inner wall of the capacitor case is spaced from the motor sleeve when the capacitor case is attached to the motor sleeve.

* * * * *